No. 657,919. Patented Sept. 18, 1900.
A. J. CROSS.
OPTOMETER.
(Application filed June 16, 1899.)
(No Model.)
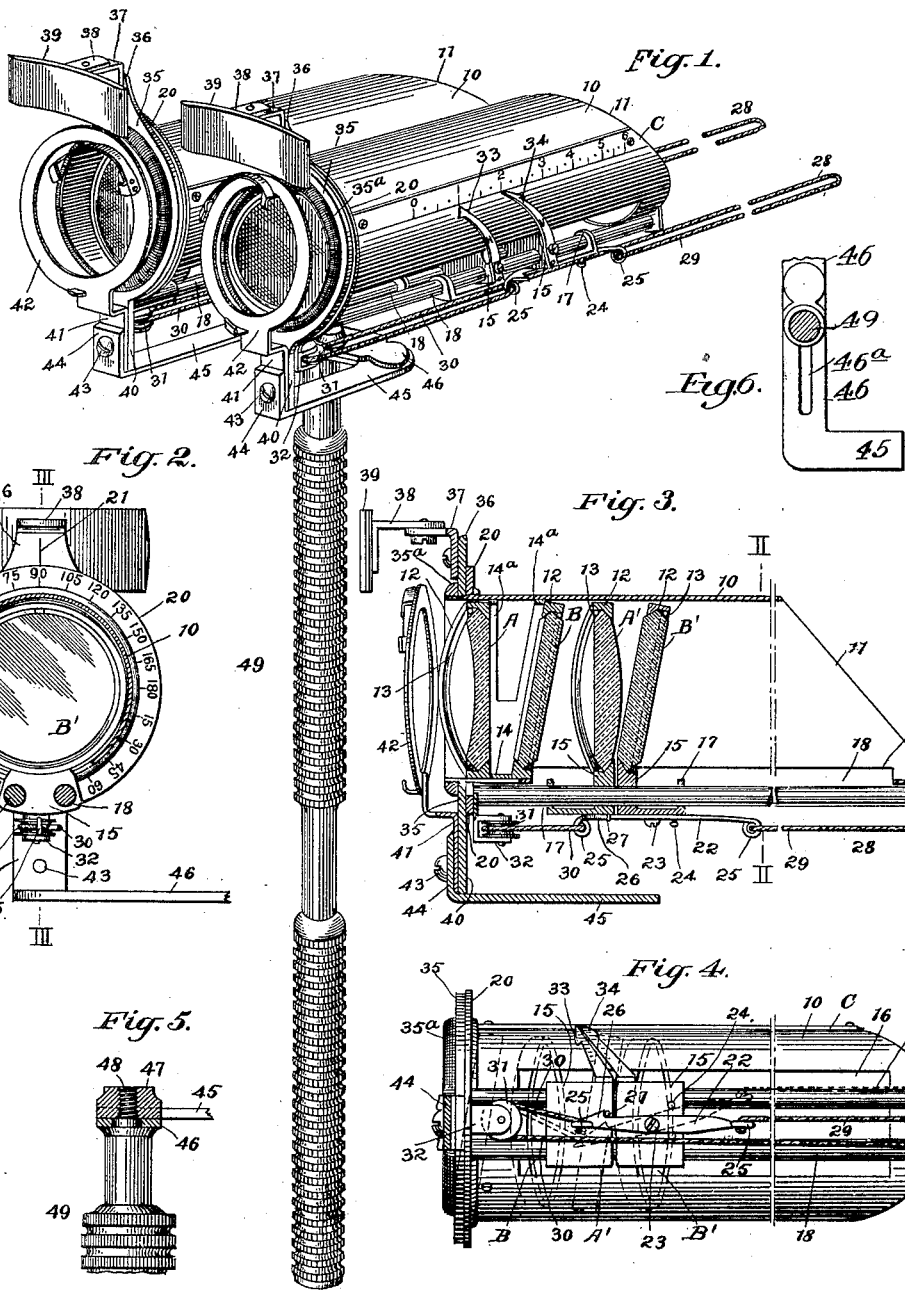
WITNESSES:
C. S. Cowley.
G. J. Carey.
INVENTOR
Andrew J. Cross.
BY
Hutchinson & Criswell,
ATTORNEYS.

UNITED STATES PATENT OFFICE.

ANDREW JAY CROSS, OF NEW YORK, N. Y.

OPTOMETER.

SPECIFICATION forming part of Letters Patent No. 657,919, dated September 18, 1900.

Application filed June 16, 1899. Serial No. 720,765. (No model.)

*To all whom it may concern:*

Be it known that I, ANDREW JAY CROSS, of the city, county, and State of New York, have invented certain new and useful Improvements in Optometers, of which the following is a full, clear, and exact description.

My invention relates to improvements in eye testing and measuring instruments; and the object of my invention is to produce an instrument that will aid in the objective estimation or measurement of errors of ocular refraction in either a monocular or binocular manner.

It is well known that the present method of measuring the refractive condition of eyes in an objective manner is accomplished by means of reflected light, the mirrors used for this purpose being both plane and curved with a perforation in the center and known by the technical terms "opthalmascope," "retinoscope," "skiascope," &c., the most popular instruments for this purpose being the latter two. The method is also known by several names those of "retinoscopy," "skiascopy," and "shadow-test" being generally employed. Considerable skill is required in making tests by this method, owing to the smallness of the pupil of the eye under examination; also, to the multiplicity of extraneous light reflections caused by the mirror-like surface of the lenses when they are placed before an eye. Then, too, much trouble is experienced by the examiner in changing all these lenses in order that the light may be properly refracted. My invention is designed to overcome these drawbacks and to greatly increase the apparent size of the pupil, obviate the extraneous light reflections, and enable the examiner to control the refractive value of the instrument or lens series by means of cords or equivalent devices instead of by placing and replacing lenses of varying strength.

Another object of my invention is to mechanically arrange the lens series forming its essential feature, so that the same may be very conveniently operated in any necessary combination or inclination to get the right refractive effect.

To these ends my invention consists of an eye-testing apparatus the construction and arrangement of which will be hereinafter described and claimed.

In the drawings, wherein similar characters of reference designate similar parts, Figure 1 is a perspective view of the apparatus embodying my invention. Fig. 2 is a broken vertical cross-section on the line II II of Fig. 3, showing a detail of the sight-tubes and the graduated arc surrounding the tubes. Fig. 3 is a broken longitudinal section on the line III III of Fig. 2. Fig. 4 is a broken inverted plan, partly in section, of one of the sight-tubes. Fig. 5 is a detail section of the handle and its connection with the supporting-arms of the sight-tubes; and Fig. 6 is a broken inverted plan view, partly in section, of the overlapping arms and handle which carry the sight-tubes.

In this invention two sight-tubes 10 are employed, which are preferably inclined at the rear end, being cut away at the top, as shown at 11, so that the examiner can get better light and more conveniently look through them into the eyes of the patient. Obviously one tube can be used, if preferred; but it is better to have two, and these carry the several lenses to be presently described and are held parallel with each other on a suitable handle, so that the subject whose eyes are to be examined holds the instrument to his eyes as he would a long-handled opera-glass while the examiner looks through the instrument and into the pupil of the patient's eye.

In each tube is a series of lenses A and A' and B and B'. These lenses are all cylinders and are placed with their axes at slight angles to the perpendicular. The lenses A and A' have their axes horizontal, and they are also in harmony as to angle, while the lenses B and B' are likewise similarly in harmony, having vertical axes and similar angles. The lenses A and B are negative lenses and are given the right inclination to each other, and they are also held in a stationary position, while the lenses A' and B' are positive lenses and are slidable longitudinally in relation to each other and in relation to the fixed lenses A and B. It will be seen that this arrangement of lenses placed at correct angles to have the right refractive effect and with part of them movable, so as to get the right effect of magnification, gives the following results: First, it enables the apparent size of the pupil to be quickly increased, so it can be seen distinctly at a distance of one or more meters, second, it overcomes extraneous light reflections without interfering with the refractive valve of the lenses used, and, third, it enables the examiner to control the spherical and cylindrical lens quantity desired. The mechanism by which all this is accomplished will be now described.

The several lenses are mounted in the customary lens-rings 12, in which they are held by the split rings 13; but it will of course be understood that the lenses may be mounted in any convenient manner without affecting the invention.

The stationary lenses A and B are held in a fixed ring 14, which has diverging upper branches 14ª, forming abutments for the lens-rings 12 and giving a permanent inclination to the lenses A and B. As shown by the drawings, these have slight inclinations vertically and also horizontally, the adjustment being ascertained so as to give the correct refractive effect and utilize and dissipate, when taken in connection with the other lenses described, detrimental reflective and shadow effects. The lenses A' and B' have their rings fixed to slide-blocks 15, which are movable back and forth in the tube, extending downward through an opening 16 in the tube-bottom, and the said blocks are widened at their lower ends and have upturned flanges 17, so as to give them a better grip on the guide-rods 18, on which they slide. This widening of the slide-blocks causes the lens-rings to be held steadily, which is of course necessary. It will be noticed that these last-mentioned lenses A' and B' are inclined also laterally and vertically, and as their meridional axes are at right angles to each other they have when in close connection a spherical effect, and when separated more or less spherical or cylindrical effects can be had when taken in connection with the other lenses A and B, which are also cylinders having meridional axes at right angles to each other.

The guide-rods 18 can be held in any convenient way; but, as shown, they are at one end fixed in a hanger 19, depending from the rear end of the tube 10, and at the other in the ring 20, which encircles the tube and is fixed to the same. In this connection it will be noticed, especially by reference to Fig. 2, that the ring 20 has a graduated scale thereon adapted to turn with the tube opposite the vertical mark 21 on the fixed portion 36 of the apparatus, hereinafter to be described, so that the axis of cylindrical curvature can be noticed by reference to the mark and the scale. It is of course apparent that the marked part can be made to move with the tube and the scale held stationary with the same effect.

To provide for moving the slide-blocks 15 separately or in unison, one of them is provided with a latch 22, which is pivoted on its under side, as shown at 23, and has its movement limited by the studs 24, which are fixed to the block, and this latch overlaps the other slide-block 15 and has its ends formed into eyes 25 to receive the cord by which it is operated. The locking end of the latch is provided with a shoulder 26, which is adapted to engage a stud 27 on the second block 15. The latch is operated and the slide-blocks and their lenses moved by a cord 28, one end 29 of which is fixed to the rear eye 25 of the latch and the other end 30 of which is passed around a pulley 31 and secured to the forward eye 25 of the latch. The pulley 31 is pivoted in a suitable hanger 32 at the front end of the tube for the purpose of giving the right direction to the latch and slide-blocks when the cord 28 is pulled.

Referring now especially to Fig. 4, it will be seen that by pulling on the end 29 of the cord and at the same time bearing slightly to one side the latch can be held in connection with the stud 27, so that both slide-blocks 15 are locked together and the two lenses A' and B' are simultaneously moved, and moved to the same extent, so that the desired magnifying spherical effect can be obtained; but if the slide-blocks 15 are to be moved separately the operator carries the end 29 of the cord in the opposite direction, which turns the latch 22 on its pivot and releases it from the stud 27, thus unlocking the slide-blocks, and so the continued movement of the end 29 of the cord will pull forward the rear slide-block 15 and lens B' without in the least affecting the other slide-block and the lens A'. By pulling on the end 30 of the cord the rear slide-block 15 can be pulled back until it is in connection or abutment with the forward slide-block 15, after which both slide-blocks and their lenses may be moved forward by a continued pull in the same direction. It will thus be seen that the examiner can stand the requisite distance in front of the apparatus and look through it into the pupils of his patient's eyes and that by a very slight manipulation of the cord 28 he can place the movable lenses A' and B' into position to get whatever effect is necessary.

In order that the position of the lenses may be correctly noted when they are placed in position to get the desired effect, a graduated table C is produced on the side of the tube, and indicators or pointers 33 and 34 are attached to the slide-blocks 15 of the lenses A' and B', so as to move along this table. The tube at its front end is journaled in a supporting-ring 35 and held in position by a nut 35ª, which is screwed to the exterior of the tube at the front end. This ring 35 has an extension 36 at the top, on which is produced the indicating-mark 21, above noted, and the extension carries the angle-bracket 37, to which is pivoted the second angle-bracket 38, and this carries the headpiece 39, adapted to rest against the brow of the patient. This arrangement of the headpiece is not specifically described or claimed, because it is shown and described in another application, Serial No. 720,764, for an eye-measuring instrument which I have filed simultaneously with this one. The ring 35 has also an arm 40 on its under side, to which is held the stem 41 of the clip 42, which is not described in detail, because it is like the usual clips for this purpose and is held in front of the sight-tube to receive any auxiliary lenses which may be necessary in examining the eyes. The parts 40 and 41 are secured by a screw 43 or similar fastening to the upturned end 44 of the horizontal arm 45 46, which extends backward and laterally beneath the sight-tube, where it overlaps a similar arm of the second sight-tube, the lower arm being slotted at 46ª and the upper being provided with a nut 47, adapted to receive the screw-threaded end 48 (see Fig. 5) of the handle 49. This arrangement provides for the easy lateral adjustment of the tubes and the support of them; but in detail it is described and claimed in my other application above referred to.

From the foregoing description it will be noted that the subject or patient can place the apparatus to his eyes, that the examiner may then stand in front of him the correct distance and by manipulating the cords 28 can easily bring the lenses to the desired position, so that the pupil of the eye may be made the right apparent size and quickly viewed.

I have referred heretofore to the essential facts relating to the successful examination of the eye—that is, the instrument must increase the apparent size of the pupil, so that it can be seen distinctly at a distance of one or more meters away; second, it must overcome extraneous light reflection without interfering with the refractive value of the lenses used, and, third, that it must enable the spherical and cylindrical lens quantity to be easily controlled. That these points are fully covered in the invention herein described will be seen from the foregoing description in connection with the following statement: With reference to the first essential it must be borne in mind that the reason the shadow reverses, in estimating refractive errors by skiametry, is due to the fact that the emerging rays of light from an eye undergoing examination cross one another in front of both patient and examiner. The rays therefore in order to show a pronounced movement one way or the other in the form of light or shadows must be intercepted by the examiner's eye at a point considerably removed from the place where the rays cross. If, say, a two-diopter convex lens is used where the illumination is from parallel rays of light, this crossing in rays emerging from an emmetropic eye will be at a distance of twenty inches. Add a quarter of a diopter, and the crossing will take place at eighteen inches distance; subtract a quarter, and the crossing will be at twenty-two inches, or a variation of only about two inches either way. Now if a lens of three-quarters of a diopter is employed the crossing of the rays will be at about fifty-three inches distance; add a quarter of a diopter, and the crossing will be changed to forty inches; subtract a quarter, and it will be at eighty inches, a variation of thirteen inches one way and of twenty-seven inches the other. Hence the value of the weaker lens-power from a skiametrical point of view. The greater the increase in distance between patient and examiner, however, the more difficult it becomes for the latter to see the pupil of the former, and it is for this reason that the size of many pupils must be magnified or apparently enlarged. As to the second essential, wherein extraneous light reflections are to be overcome without interference with the refractive value of the lenses, it is well known that the slightest tilting of a spherical lens or the transmitting of rays of light through it in any direction other than that which is in accord with its optical axis will cause appreciable spherial errors, or what is called "cylindrical equivalents." This law applies to cylindrical lenses, too, in all but one meridian, and that one is its axis, so that if the tilting of the lens is parallel to this axis the only error that will manifest itself will be of a slightly-prismatic nature, producing a curved displacement. Now as to the third essential, regarding the easy and practical manner of controlling the lens-power from a distance, it will be seen that it is quite necessary for the examiner to remain at a fixed distance from the patient, so as to be able to note any slight variation in lens-power without having to alter this position in order to change lenses. Then, too, speed is a consideration, for nearly all objective examinations are more or less fatiguing and uninteresting to patients in general. The examiner, therefore, when one hand is occupied with the skiascope-mirror, should be able to fully govern the lens-power of the retinoskiameter with the other hand, and at any distance for which the instrument may be adjusted.

It will be noticed that the essential thing in this invention is to have the series of cylindrical lenses arranged in pairs, as stated, with their meridional axes at right angles to each other, that the planes of the positive and negative lenses should be parallel, and that each correlated pair be inclined to the necessary extent from the perpendicular, and it will be further noticed that this effect can be had and that the necessary movements may be given with mechanism differing greatly from that herein illustrated and described. Consequently I do not confine the invention to the precise form of apparatus herein disclosed.

Having thus described my invention, I claim as new and desire to secure by Letters Patent—

1. The combination of a series of cylindrical lenses arranged on a common optical axis and inclined in relation to each other.

2. The combination of a series of cylindrical lenses arranged on a common optical axis, said lenses being inclined and movable along their optical axis in relation to each other.

3. An apparatus of the kind described comprising a rotatably-mounted sight-tube and cylindrical lenses arranged therein, the lenses being inclined with relation to each other, substantially as described.

4. An apparatus of the kind described, comprising a series of cylindrical lenses arranged on a common optical axis, along which they are movable and inclined in relation to each other, and means extensible from the support of the said lenses by which they can be operated.

5. In an apparatus of the kind described, the combination of the cylindrical lenses with crossing meridional axes to produce spherical effects, the lenses being inclined in relation to each other, substantially as described.

6. In an apparatus of the kind described, the combination of a series of cylindrical lenses arranged on a common optical axis with crossing meridional axes, the lenses being inclined in relation to each other and some of them being movable with respect to the others.

7. The combination of the series of cylindrical lenses arranged on a common optical axis and inclined in relation to each other, some of the lenses being movable along their optical axis in relation to the other lenses, and means for operating the said lenses, said means being extensible from the instrument in which the lenses are supported.

8. An apparatus of the kind described comprising a series of correlated pairs of cylindrical lenses, one pair being stationary and the others movable in respect to the stationary lenses and in relation to each other.

9. An apparatus of the kind described comprising a series of cylindrical lenses arranged in correlated pairs, one pair being stationary and the other lenses movable in relation to the stationary lenses and to each other, the several lenses being also inclined in relation to each other.

10. The combination with the stationary lenses of the movable lenses, a locking device to hold the movable lenses together, and mechanism for moving the movable lenses together or separately, substantially as described.

11. The combination with the stationary lenses of the movable lenses, an operating-cord to move the lenses, and a connection between the cord and lenses by means of which the latter may be moved together or separately, substantially as described.

12. An apparatus of the kind described comprising suitably-supported stationary lenses, a pair of movable lenses arranged on the same optical axis as the stationary lenses, slide-blocks suitably supported carrying the movable lenses, a cord for moving the slide-blocks, and a locking device operated by the cord to hold the slide-blocks together and to release the same, substantially as described.

13. An apparatus of the kind described comprising a sight-tube, suitable stationary lenses therein, slidable lenses also mounted in the tube, a latch to hold the slidable lenses together, and a cord connecting with the latch to operate the same and move the lenses, substantially as described.

14. An apparatus of the kind described comprising a sight-tube, a pair of stationary cylindrical lenses mounted therein, said lenses being at angles to each other and having their meridional axes at right angles, and a second pair of lenses movably mounted in the said tube, the said second pair of lenses being also at angles to each other and having crossing meridional axes, substantially as described.

15. In an apparatus of the kind described, the combination with the sight-tube and the stationary inclined cylindrical lenses therein having crossing meridional axes, of a second pair of lenses mounted in the tube and movable longitudinally therein and in relation to each other, the movable lenses having axes, angles and inclinations corresponding to those of the stationary lenses, substantially as described.

16. In an apparatus of the kind described, the combination with the sight-tube of the stationary lenses therein, and the ring supporting the lenses, said ring having diverging parts serving as abutments to the lens-rings, substantially as described.

17. The combination with the sight-tube of the movable lenses therein, the slide-blocks carrying the lenses, and the latch pivoted on one slide-block and means on the second slide-block for engagement with the latch, substantially as described.

18. The combination with the sight-tube having an opening therein, of the lens-rings protruding through the opening and merging in the slide-blocks, the guide-rods supporting the slide-blocks, and the latch pivoted on one slide-block and engaging the other, substantially as described.

19. The combination with the sight-tube, the movable lenses, and the slide-blocks carrying the lenses, of the latch pivoted on one slide-block and engaging the second slide-block, a pulley in advance of the second slide-block, and a cord extending over the pulley, the ends of the cord being fixed to opposite ends of the latch, substantially as described.

ANDREW JAY CROSS.

Witnesses:
WARREN B. HUTCHINSON,
P. S. POWLEY.